United States Patent
Hedoire et al.

(10) Patent No.: US 9,029,439 B2
(45) Date of Patent: May 12, 2015

(54) ADDITIVE FOR A BITUMEN AND BITUMINOUS PRODUCT

(75) Inventors: Claude-Emmanuel Hedoire, Ezanville (FR); Gilles Orange, Vourles (FR); Xiao Ping You, Wuhan (CN)

(73) Assignee: Rhodia (China) Co., Ltd., Shanghai (CN)

( * ) Notice: Subject to any disclaimer, the term of this patent is extended or adjusted under 35 U.S.C. 154(b) by 0 days.

(21) Appl. No.: 13/979,635

(22) PCT Filed: Jan. 28, 2011

(86) PCT No.: PCT/CN2011/070778
§ 371 (c)(1),
(2), (4) Date: Jul. 12, 2013

(87) PCT Pub. No.: WO2012/100432
PCT Pub. Date: Aug. 2, 2012

(65) Prior Publication Data
US 2013/0303666 A1  Nov. 14, 2013

(51) Int. Cl.
*C08L 95/00* (2006.01)

(52) U.S. Cl.
CPC ............. *C08L 95/00* (2013.01); *C08L 2555/22* (2013.01); *C08L 2555/34* (2013.01); *C08L 2555/40* (2013.01); *C08L 2555/52* (2013.01); *C08L 2555/54* (2013.01)

(58) Field of Classification Search
USPC ......................................................... 524/59
See application file for complete search history.

(56) References Cited

U.S. PATENT DOCUMENTS

| 6,767,939 | B2 | 7/2004 | Butler et al. | |
| 7,402,619 | B2 * | 7/2008 | Stephens | 524/68 |
| 2004/0249024 | A1 | 12/2004 | Buras et al. | |
| 2006/0249049 | A1 * | 11/2006 | Martin | 106/273.1 |
| 2011/0021672 | A1 * | 1/2011 | Crews et al. | 524/60 |

FOREIGN PATENT DOCUMENTS

| JP | 2009-197060 A | 9/2009 | |
| JP | 2009-209184 A | 9/2009 | |
| JP | 2009197060 | * 9/2009 | ................ C08L 9/00 |
| JP | 2009209184 | * 9/2009 | ............. C08L 95/00 |
| WO | 2005/065177 A2 | 7/2005 | |

OTHER PUBLICATIONS

Translation of JP 2009-209184, Sep. 17, 2009.*
Translation of JP 2009-197060, Sep. 3, 2009.*
International Search Report issued on Nov. 10, 2011, in corresponding International Application No. PCT/CN2011/070778.

* cited by examiner

*Primary Examiner* — Hui Chin
(74) *Attorney, Agent, or Firm* — Xuping Fu

(57) ABSTRACT

An additive for a bitumen or polymer modified bitumen product, which is prepared by mixing together a sulphur-based product, a vulcanized rubber, for example, a waste vulcanized rubber, preferably a fatty acid, and a bitumen, is described. The use of this additive for preparing, with very limited gaseous emissions, elastomer-containing bituminous product is also described. Such use may be especially suitable for making bituminous coated material including, for example, asphalt concrete.

21 Claims, No Drawings

“ADDITIVE FOR A BITUMEN AND BITUMINOUS PRODUCT”

CROSS-REFERENCE TO PRIOR APPLICATIONS

This application is a National Stage of PCT/CN2011/070778, filed Jan. 28, 2011, and designating the United States (published in English on Aug. 2, 2012, as WO 2012/100432A1), which is hereby expressly incorporated by reference in its entirety and assigned to the assignee hereof.

FIELD OF THE INVENTION

The instant invention relates to additives which are intended to be used in bitumen and polymer modified bitumen and, more generally speaking, in bituminous products made from bitumen and polymer modified bitumen.

BACKGROUND OF THE INVENTION

According to the instant description, the expression "bituminous product" intends to depict a bitumen or a composition including a bitumen together with additional ingredients such as aggregates and/or additives, such as an asphalt for example.

"Polymer modified bitumen" refers to a bitumen containing an additional polymer, for example an elastomer such as rubber or a thermoplastic elastomer, said polymer having preferably a good enough dispersibility and/or solubility in bitumen.

Bituminous products are commonly known and may be used in many fields, e.g. mixed with mineral aggregates, to produce paving materials or coatings, especially on roadways. There are also used for imparting waterproofing, for example for the production of roofing felt and for sealing flat roofs.

As regards their application for producing paving materials on roadways, bituminous products are commonly used as a bituminous binder together of mineral fillers, such as aggregates, granulates, gravels, sand and fines. The association of the bituminous binder and the mineral filler is commonly referred as being a so-called "bituminous coated material", "asphalt concrete" or "bituminous mix" ("enrobé bitumineux", in the French language).

It is well known that bituminous coated materials consisting of a consolidated mixture of bitumen and aggregate are not satisfying as such, and that they exhibit many drawbacks which render them improper to a direct use, i.a. in the field of roadways. Especially, a raw bituminous coated material is highly temperature-sensitive, with a relatively poor adherence between the mineral filler and the bituminous binder, and has a poor resistance to strain and mechanical shocks.

In roadways application, especially in the upper layer of the road covering which is in contact with the tires of the vehicles, the bituminous coated material generally have a content of bituminous binder of about 2 to 10%, typically of about 5% by weight. With such high concentrations of bituminous binder, the role of the binder is of major importance, which may lead to some troubles if the bituminous coated material is used as such. Especially, it may lead to thermal fractures, fatigue and/or rutting.

More precisely, at low temperatures (typically −10° C. or less), the bituminous binder is in a vitreous state and is therefore brittle. This brittleness, associated to the heterogeneity of the bituminous coated material, often lead to microcracking which form unsatisfying transversal cracks, due to the thermal stress.

At higher low temperature (especially from −5 to 0° C.), some other cracks may still appear, which generally lead to longitudinal cracks, generally interconnected.

On the other hand, at high temperatures (typically above 50° C., especially of about 60° C.), the bituminous binder becomes visco-plastic, and more and more fluid when the temperature increases. Therefore, intensive passages on the roadways of heavy masses such as vehicle axles including trucks induce a permanent deformation of the bitumen and therefore of the roadway track. This phenomenon is the source of the rutting damage.

The formation of such cracks, and/or rutting have to be avoided, especially as the bituminous binder furthermore ensures a waterproofing of the roadway, which protects the basis of the roadway.

Hence, especially for roadways application, it is sought for a bituminous binder that it preferably exhibits the following properties:
- a good resistance to cracking at low temperature, especially at −10° C. or below;
- a low deformation at high temperature, especially at 50° C. or above;
- a high resistance to fatigue, so as to provide long term durability.

To this end, additives have been proposed for improving the properties of the bituminous products and overcome the deficiencies of bituminous binders.

In this connection, it is e.g. known to make use of additives which are elastomeric polymers. However, such elastomeric polymers have some drawbacks.

Especially, elastomeric polymers are not easily dispersible in the bitumen, and precautions have to be taken in order to obtain a suitable homogenous dispersion of such additives in a bituminous product.

Moreover, phase separation phenomenon between the elastomeric polymer and the melt bitumen tends to occur, especially during storage. Therefore, elastomeric polymers containing bituminous products may dramatically change upon storage. So as to avoid such phase separation, there is a need for complex installations which can maintain high temperatures and continuous mixing before the use of the modified bituminous product.

For these reasons, it is commonly made use of sulphur in bitumen products modified with elastomeric polymers, since it allows avoiding the above drawbacks. It is advanced that sulphur favours interactions (bounds) betweens the polymer and the bitumen, leads to a reinforcement of such interactions and also favours and reinforces a crosslinking upon heat treatment.

Many forms of sulphur may be uses, including elementary sulphur and sulphur donors. Typically, sulphur is incorporated in the form of powder, granulates and/or scales, optionally with other additives.

The benefits of the sulphur introduction are however by some drawbacks, which rise in practice when incorporating the sulphur in the bitumen product. Especially, the use of sulphur or sulphur containing products leads to a production of toxic gaseous product, such as hydrogen sulphide. Then, again, there remain a need of complex installations and/or a need of carrying out the incorporation of the sulphur at low temperature, which extends the duration of the processes.

Processes which implement sulphur and/or sulphur compounds are e.g. disclosed in U.S. Pat. Nos. 6,767,939 and 7,402,619, wherein the described methods systematically lead to a side production of hydrogen sulphide.

Alternatively, it has been proposed to make use of sulphur-free dispersing agents in bitumen modified by polymer, e.g.

2-ethylhexyl acid phosphate as contemplated in US 2004/0249024. Such a dispersing agent reveals however difficult to be carried out and is not compatible with common installations for bitumen treatment.

DESCRIPTION OF INVENTION

One aim of the instant invention is to provide a solution to improve the properties of a bitumen product, especially its stability upon storage and its performances in use, without leading to the drawbacks which have been pointed out hereinabove.

To this end, the invention proposes to make use of a specific sulphur-based additive, which has revealed, in the scope of the works that lead to the instant invention, to be very easy to incorporate into a bitumen product and which, surprisingly, leads to reduced emissions of sulphur-based gaseous products such as hydrogen sulphide.

More precisely, according to a first aspect, the instant invention relates to a additive for bitumen product which is prepared by mixing together:
 (a) a sulphur-based product;
 (b) a vulcanized rubber;
 (c) preferably a fatty acid;
 (d) a bitumen (which is in nature similar to or distinct from the bitumen of the bitumen product wherein the additive is intended to be used).

Generally, the additive comprise compounds (a) to (c) bound together by the bitumen (d).

When introduced in a bituminous product, the additive according to the invention imparts improvements, especially a strong enhancement of the stability upon storage. Besides, it also maintains or improves the performance of resistance to cracking, to deformation at high temperature and to fatigue. Surprisingly, the additive of the invention allow this improvements with a reduced content of polymer in comparison with most of the polymer modified bitumen proposed in the prior art.

In addition to these advantages, the additive of the invention reveals to generates only very little quantities of gaseous products when it is incorporated into the bitumen products, which is especially unexpected for a sulphur-based additive of this type.

Besides, this additive reveals to be entirely compatible with the common conditions for preparing bituminous products.

Moreover, the additive of the invention is generally in the form of granules or agglomerates, which is a very advantageous form which renders it very easy to be manipulated, especially in an easier way than a powder or a liquid. Compounds (a) to (d) are typically mixed together in a mixer and then shaped into a film, which is advantageously consolidated by heat treatment and the film may then be crushed and/or cut into small pieces or granulates. Any other ways of agglomeration can be used, that i.a. include calendering, extrusion.

According to another aspect, the instant invention relates to the use of this additive for preparing an elastomer-containing bituminous product. More specifically, in this connection, one subject-matter of the invention is a process for preparing an elastomer-containing bituminous product, which comprises the following successive steps:
 (i) a sulphur-based additive as defined above is prepared by mixing together:
  (a) a sulphur-based product;
  (b) a vulcanized rubber;
  (c) preferably a fatty acid;
  (d) a bitumen;
  and then (ii) the sulphur-based is added a into a composition (C) comprising a bitumen, said bitumen being in nature similar to or distinct from the bitumen (d) employed in step (i), and said bitumen of composition (C) being preferably a polymer modified bitumen;
 (iii) optionally, additives and/or aggregates and/or bitumen are mixed in the composition obtained in step (ii).

The instant invention also relates to the elastomer-containing bituminous product as obtained according to this process.

The sulphur-based compound (a) used according to the invention may be elementary sulphur, a sulphur donor compound, or a mixture of elementary sulphur and of at least one sulphur donor compound. Typically, compound (a) is used in the form of powder, granulates and/or scales.

The content of the sulphur-based compound (a) in an additive of the invention is preferably of from 20% to 70%, more preferably from 40% to 60%, for example from 45% to 55% by weight, on the basis of the total weight of the additive.

The vulcanized rubber (b) is based on at least one elastomeric natural, hemisynthetic or synthetic polymer (rubber), generally obtained by a polymerisation of monomers including diene units, which is specifically vulcanized.

The rubber constituent of vulcanized rubber (b) may especially be a natural polyisoprene; a copolymer of styrene and butadiene, a terpolymer of ethylene, propylene and diene, or a mixture thereof. This rubber may further include other compounds, such as a plasticizer, such as an oil or a resin, for example an aromatic oil which may be naphtenic or paraffinic or synthetic (ester or phtalate for example).

The vulcanization of the vulcanized rubber (b) may be obtained by any known method, typically by a heat treatment (for example at about 150-200° C.) of the rubber in the presence of a vulcanization agent, typically sulphur, preferably together with a mineral oxide such as ZnO and optionally with an activator, such as CBS (N-cyclohexyl-2-benzothiezyl sulfamide) for example and/or other actives such as 6PPD (N-(1,3-dimethylbutyle)-N'-phenyl-p-phenylenediamine) or phenolic derivatives. These compounds may be detected in the vulcanized rubber (b).

According to a specific embodiment, the vulcanized rubber (b) may advantageously be obtained from recycling waste vulcanized rubber objects, for examples waste tires, generally cut into pieces and preferably powdered before its use in step (i). Advantageously, the compound (b) is implemented in step (i) of the invention in the form of a rubber crumb, namely a powder with a granulometry preferably of at most 10 mm, and more advantageously of at most 5 mm. In this regard, the invention provides an interesting way to recycle waste vulcanized rubber. The rubber crumb used in step (i) is preferably obtained from tires of light or heavy vehicles, but may also be obtained from other sources.

The content of vulcanized rubber (b) in the additive of the invention is generally from 10% to 50% preferably from 30% to 40% by weight, on the basis of the total weight of the additive.

The fatty acid (c) which is used according to the invention may especially be selected from lauric, myrisic, palmitic, stearic, arachidic, palmitoléic, oleic, erucic, linoleic, linolenic acid and mixtures thereof. More generally, fatty acid having a saturated or unstaurated fatty chain comprising from 10 to 24 carbon atoms may be used in the scope of the invention. These fatty acids may be used as such or optionally in the form of the corresponding salts. According to a specific embodiment, saturated fatty acid are used. An especially suitable fatty acid in the scope of the instant invention is the stearic acid.

The content of the fatty acid (c) in the additive of the invention is, when present, generally from 0.01% to 30%, more preferably from 1% to 4% by weight, on the basis of the total weight of the additive.

The bitumen (d) which is used in the additive of the invention is a bituminous binder which may be selected from a great numbers of bitumens. Suitable bituminous binders include standard bitumens, for example parafinic or phenolic bitumens from different origins or any other bitumen source.

The content of the bitumen (d) in the additive of the invention is generally from 5% to 35%, preferably from 10% to 20%.

Thus, according to a specific embodiment of the invention, the additive, as prepared in step (i) of the process of the invention comprises (and for example consists in), by weight, on the basis of the total weight of the additive:

(a) from 40% to 60%, preferably from 45% to 55%, of a sulphur-based product;
(b) from 30% to 40% of vulcanized rubber;
(c) from 1% to 4% of fatty acid; and
(d) from 10% to 20% of bitumen.

According to a very specific embodiment, the additive, comprises (and may for example consists in), by weight, on the basis of the total weight of the additive:

(a) from 45% to 55% (for example 48% to 52%) of sulphur;
(b) from 30% to 40% (for example about 33% to 37%) of a vulcanized rubber;
(c) from 1% to 4% (for example 1.5% to 2.5%) of stearic acid; and
(d) from 10% to 20%, preferably less than 15% (for example about 12%) of bitumen.

Whatever the exact composition of the additive which is prepared in step (i) of the process of the invention, this additive is preferably hot incorporated in step (ii). Namely, in step (ii), it is preferable for the composition (C) to be heated when introducing the additive. In that case, the temperature of the composition (C) is typically from 150 to 200° C. Depending on the nature of the bitumen, it could be preferable to maintain the temperature below a temperature, well known from the skilled person, above which the properties of the bitumen may decrease. Often, it reveals advantageous to maintain the temperature below 180° C.

Besides, step (ii) may advantageously be carried out by using the same equipment than the equipments used for commonly introducing a polymer into bitumen. For example, the incorporation of the additive in the composition (C) in step (ii) may be carried out by the way of a plasticating screw or a pneumatic conveyor, with a temperature of the composition (C) preferably of 170-180° C., before, during and after the introduction of the additive.

In step (ii), the amount of the additive added into the composition (C) is preferably of between 0.05% to 0.5%, for example from 0.1% to 0.2%, e.g. of about 0.15% by weight, this percentage being expressed by the ratio of the weight of the additive to the weight of bitumen contained in composition (C).

The incorporation of the additive in the composition in step (ii) is moreover relatively easy and therefore does not require extensive mixing times. Typically, a good incorporation is obtained for a mixing time of about 30 minutes. Thus, the process of the invention does not increase in a dramatic way the fabrication times and is therefore suitable for a production on a industrial scale. Typically, the time needed for preparing a polymer modified bitumen product according to the process of the invention takes about 1 to 3 hours.

The composition (C) used in step (ii) advantageously include an elastomeric polymer, typically a SBS (polymer styrene-butadiene-styrene) as an additive, typically in an amount of 1% to 5% by weight, generally in an amount of 2.5% to 3% by weight. The content of such an elastomeric polymer may be decreased in the instant invention in comparison with the composition of the prior art when obtaining similar or even enhanced properties, due to the specific use of the additive.

According to a specific variant, the above elastomeric polymer such as SBS may be originally absent in composition (C) and be introduced only in a second stage, together with the additive during step (ii). In that case, the additive of the invention may for example be admixed with granules of the elastomeric polymer before introducing the mixed compositions into the hot composition (C).

Especially at the preferred amounts indicated hereinabove, an additive according to the invention incorporated in a standard bitumen including 3% of SBS enhances the properties of the bitumen and renders it in conformity e.g. with the requirements of the standard EN14023. Especially, the introduction of the additive enhances the stability upon storage, with a difference of the softening point (according to standards EN13399/EN1427) which generally becomes well lower than 5° C. (in other words, it allows obtaining modified bitumen of class 2).

A the end of step (ii), step (iii) may optionally be carried out if further additive should be introduced. Step (iii) may especially be carried out for introducing mineral fillers and form a bituminous coated material. Step (iii) is however not compulsory in the scope of the instant invention.

After step (ii) and the optional step (iii), the obtained elastomer-containing bituminous product is typically let to age (for example in a maturating tank) for a few hours (for examples 1 to 10 hours), preferably at a temperature similar to that of step (ii), for example at 180-185° C. or just below (160-180° C. typically).

The elastomer-containing bituminous products obtained according to the process of the invention have especially good properties, with reduced content of elastomers. For example, it is possible with 0.1% of additive to reduce up to 0.5% the content of the elastomeric polymers such as SBS, by maintaining elastic properties of the bitumen product (softening point Tr&b, penetration Pen, elastic recovery ER, ductility).

The elastomer-containing bituminous products obtained according to the process of the invention may especially be used for preparing bituminous coated material, especially high performance bituminous coated material, i.a. of the different asphalt concrete types.

EXAMPLES

The following examples illustrate the invention without restricting its scope.

Example 1

Preparation of an Additive

A mixture having the following composition (percentages are by weight) has been introduced in a mixer:
sulphur (powder): 50%
vulcanized rubber crump (issued from waste tires—granulometry <5 mm): 35%
bitumen: 13%
stearic acid: 2%

The mixture has been homogeneized in the mixer, and then has been passed into a vertical device (calender) allowing to form a continuous film, which deposits on a conveyor belt. This film has been consolidated by heating under a thermal line (IR heater) and then cold.

Then, the film has been crushed into granulates having a size between 2 and 10 mm.

Example 2

Effect of the Additive in a Bitumen Product

Two bitumen have been tested in this example, namely:
a bitumen from Eastern Europe (B type)
a bitumen from Middle West (G type)

These bitumens have been modified by introduction of 3% of SBS, according to a standard preparation process, so as to provide two elastomer-containing bitumen compositions hereinafter referred as C1 and C2.

2.1 Introduction of the Additive

Each of compositions C1 and C2 has been submitted to the following protocol.

The composition has been placed in a beaker and has been heated on a stir plate at 170° C.

The additive (granulates) have been introduced in the hot bitumen in an amount of 0.15%.

The obtained mixture has been maintained at 170° C. for about 25 minutes with a medium agitation (rotary shaker—260 rpm), by maintaining the temperature strictly below 180° C. (so as to preserve the properties of the bitumen).

After the introduction of the additive, no formation of fumes has been observed, and the odour is not modified in comparison with the preceding step wherein the composition was heated alone.

After this mixing step, the mixture has been aged during 5 minutes at 170° C. under light stirring (disposal of the air bubbles).

This protocol respectively led to two modified bitumen, herein-after referred as compositions C1add and C2add.

2.2 Results

Compositions C1add and C2add have performance in line with the requirements of standard EN14023.

Stability upon storage has been evaluated by follow-up of the softening point, according to standard EN13399/EN1427 (the difference of the softening point (ΔTrb) has been measured between the top and the bottom of a bitumen column after 3 days at 175° C.).

The results are reported in the Table 1 below:

TABLE 1

| difference of the softening point | |
|---|---|
| Composition | Difference of the softening point ΔTrb |
| C1 (SBS - no additive) | 9.5° C. |
| C1add (SBS + 0.15% of additive) | 1.5° C. |
| C1 (SBS - no additive) | 5.8° C. |
| C2add (0.15% of additive) | 0.7° C. |

These results illustrate on of the effect of the additive, which allows to strongly improve the stability upon storage for different kinds of bitumens.

It should furthermore be stressed that compositions C1add and C2add have a difference of the softening point well lower than 5° C., which means that they are modified polymer containing-bitumen of class 2.

The invention claimed is:

1. An additive for a bitumen product which is prepared by mixing together:
   (a) a sulphur-based product;
   (b) a vulcanized rubber;
   (c) optionally a fatty acid; and
   (d) a bitumen;
   wherein the content of said bitumen (d) is from 5% to 35% by weight, on the basis of the total weight of the additive.

2. The additive of claim 1, which is in the form of granules or agglomerates.

3. The additive of claim 1, wherein the sulphur-based product (a) is sulphur.

4. The additive of claim 1, wherein the content of the sulphur-based product (a) is from 20% to 70%, by weight, on the basis of the total weight of the additive.

5. The additive of claim 1, wherein the vulcanized rubber (b) is obtained by recycling waste vulcanized rubber objects.

6. The additive of claim 1, wherein the content of the vulcanized rubber (b) is from 10% to 50%, by weight, on the basis of the total weight of the additive.

7. The additive of claim 1, wherein the fatty acid (c) is selected from the group consisting of lauric, myrisic, palmitic, stearic, arachidic, palmitoleic, oleic, erucic, linoleic, linolenic acid and mixtures thereof 8. The additive of claim 1, wherein the content of the fatty acid (c) is from 0.01% to 30%, by weight, on the basis of the total weight of the additive.

9. A process for preparing polymer modified bituminous product, the process comprising the following successive steps:
   (i) preparing a sulphur-based additive, by mixing together:
      (a) the sulphur-based product;
      (b) the vulcanized rubber;
      (c) optionally the fatty acid; and
      (d) the bitumen;
   wherein the content of said bitumen (d) is from 5% to 35% by weight, on the basis of the total weight of the additive; and then
   (ii) adding the sulphur-based additive into a composition (C) comprising a bitumen, said bitumen being in nature similar to or distinct from the bitumen (d) employed in step (i); and
   (iii) optionally, mixing additives and/or aggregates and/or bitumen in the composition obtained in step (ii).

10. A process for preparing polymer modified bituminous product, the process comprising the following successive steps:
    (i) preparing a sulphur-based additive, by mixing together:
       (a) the sulphur-based product;
       (b) the vulcanized rubber;
       (c) optionally the fatty acid; and
       (d) the bitumen;
    and then
    (ii) adding the sulphur-based additive into a composition (C) comprising a bitumen, said bitumen being in nature similar to or distinct from the bitumen (d) employed in step (i); and
    (iii) optionally, mixing additives and/or aggregates and/or bitumen in the composition obtained in step (ii),
    wherein the compound (b) used in step (i) is in the form of a rubber crumb having a granulometry of at most 10 mm.

11. A process for preparing polymer modified bituminous product, the process comprising the following successive steps:

(i) preparing a sulphur-based additive, by mixing together:
   (a) the sulphur-based product;
   (b) the vulcanized rubber;
   (c) optionally the fatty acid; and
   (d) the bitumen;
and then
(ii) adding the sulphur-based additive into a composition (C) comprising a bitumen, said bitumen being in nature similar to or distinct from the bitumen (d) employed in step (i); and
(iii) optionally, mixing additives and/or aggregates and/or bitumen in the composition obtained in step (ii),
wherein, in step (ii), the amount of the additive added into the composition (C) is between 0.05% to 0.5% by weight.

12. A bituminous product obtained according to the process of claim 9.

13. A method of making a bituminous coated product, the method comprising making the bituminous coated product using the bituminous product according to claim 12.

14. The additive of claim 4, wherein the content of the sulphur-based product is from 40% to 60% by weight, on the basis of the total weight of the additive.

15. The additive of claim 5, wherein the waste vulcanized rubber object is a waste tire.

16. The additive of claim 6, wherein the content of the vulcanized rubber (b) is from 30% to 40% by weight, on the basis of the total weight of the additive.

17. The additive of claim 7, wherein the fatty acid (c) is stearic acid.

18. The additive of claim 8, wherein the content of the fatty acid (c) is from 1% to 4% by weight, on the basis of the total weight of the additive.

19. The process of claim 9, wherein the bitumen in the composition (C) is a polymer modified bitumen.

20. The process of claim 11, wherein the amount of the additive added to the composition (C) is from 0.1% to 0.2% by weight.

21. The process of claim 11, wherein the amount of the additive added to the composition (C) is about 0.15% by weight.

* * * * *